United States Patent
Panikkar et al.

(10) Patent No.: US 12,086,643 B2
(45) Date of Patent: Sep. 10, 2024

(54) CRITICAL WORKLOAD MANAGEMENT IN CONTAINER-BASED COMPUTING ENVIRONMENT

(71) Applicant: Dell Products L.P., Round Rock, TX (US)

(72) Inventors: Shibi Panikkar, Bangalore (IN); Rohit Gosain, Bangalore (IN); Dhilip S. Kumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 490 days.

(21) Appl. No.: 17/477,013

(22) Filed: Sep. 16, 2021

(65) Prior Publication Data

US 2023/0080300 A1 Mar. 16, 2023

(51) Int. Cl.
*G06F 9/46* (2006.01)
*G06F 9/50* (2006.01)

(52) U.S. Cl.
CPC .......... *G06F 9/5038* (2013.01); *G06F 9/5044* (2013.01); *G06F 9/505* (2013.01); *G06F 9/5083* (2013.01); *G06F 2209/5022* (2013.01); *G06F 2209/508* (2013.01)

(58) Field of Classification Search
CPC ...... G06F 9/5038; G06F 9/5044; G06F 9/505; G06F 9/5083; G06F 2209/5022; G06F 2209/508
See application file for complete search history.

(56) References Cited

U.S. PATENT DOCUMENTS

| | | | |
|---|---|---|---|
| 8,429,276 B1* | 4/2013 | Kumar | G06F 9/5077 718/1 |
| 2019/0028407 A1* | 1/2019 | Perumal Vijayan | H04L 67/61 |

OTHER PUBLICATIONS

N. Yehia, "Kubernetes Self Remediation (AKA Poison Pill)," https://www.openshift.com/blog/kubernetes-self-remediation-aka-poison-pill, Nov. 18, 2020, 4 pages.
Github, "HPE CSI Driver for Kubernetes," https://github.com/hpe-storage/csi-driver, accessed Feb. 4, 2021, 3 pages.
Github, "Stork—Storage Operator Runtime for Kubernetes," https://github.com/libopenstorage/stork, accessed Feb. 4, 2021, 8 pages.

* cited by examiner

*Primary Examiner* — Gregory A Kessler
(74) *Attorney, Agent, or Firm* — Ryan, Mason & Lewis, LLP

(57) ABSTRACT

Techniques for managing critical workloads in container-based computing environments are disclosed. In one example, a method determines a resource trigger threshold associated with executing at least one containerized workload associated with a first service having a first criticality level, the resource trigger threshold corresponding to a resource capacity allocated to execute the first service. The method determines when the resource capacity allocated to execute the first service reaches the resource trigger threshold, and then re-allocates resource capacity allocated to execute at least one containerized workload associated with a second service having a second criticality level to the first service when the resource trigger threshold is reached. For example, the first criticality level may be higher than the second criticality level.

20 Claims, 7 Drawing Sheets

FIG. 4A

| SERVICE NAME | CRITICALITY | NUMBER OF PODs | REQUEST/ MINUTE | AVF RESPONSE TIME (ms) | CPU ALLOCATED | CPU CONSUMPTION (MILLI CORE) | FREE MEMORY OF NAME SPACE (MB) | RESPONSE TIME VARIATION FROM INITIAL (%) |
|---|---|---|---|---|---|---|---|---|
| CREATE SUBSCRIPTION | HIGH | 3 | 20 | 150 | 0.5 | 98 | 32 | 0 |
| CREATE SUBSCRIPTION | HIGH | 3 | 40 | 151 | 0.5 | 102 | 29 | 0.666666667 |
| CREATE SUBSCRIPTION | HIGH | 3 | 60 | 158 | 0.5 | 108 | 27 | 5.333333333 |
| CREATE SUBSCRIPTION | HIGH | 3 | 80 | 180 | 0.5 | 124 | 24 | 20 |
| CREATE SUBSCRIPTION | HIGH | 4 | 100 | 162 | 0.5 | 138 | 17 | 8 |
| CREATE SUBSCRIPTION | HIGH | 4 | 120 | 173 | 0.5 | 143 | 15 | 15.33333333 |
| CREATE SUBSCRIPTION | HIGH | 4 | 140 | 189 | 0.5 | 176 | 11 | 26 |
| CREATE SUBSCRIPTION | HIGH | 5 | 160 | 283 | 0.5 | 194 | 7 | 88.66666667 |
| CREATE SUBSCRIPTION | HIGH | 5 | 180 | 583 | 0.5 | 232 | 2 | 288.6666667 |

FIG. 4B

| SERVICE NAME | CRITICALITY | NUMBER OF PODs | REQUEST/ MINUTE | AVE RESPONSE TIME (ms) | CPU ALLOCATED | CPU CONSUMPTION (MILLI CORE) | FREE MEMORY OF NAME SPACE (MB) | RESPONSE TIME VARIATION FROM INITIAL (%) |
|---|---|---|---|---|---|---|---|---|
| CREATE SUBSCRIPTION | HIGH | 3 | 20 | 150 | 0.5 | 98 | 32 | 0 |
| CREATE SUBSCRIPTION | HIGH | 3 | 40 | 151 | 0.5 | 102 | 29 | 0.666666667 |
| CREATE SUBSCRIPTION | HIGH | 3 | 60 | 158 | 0.5 | 108 | 27 | 5.333333333 |
| CREATE SUBSCRIPTION | HIGH | 3 | 80 | 180 | 0.5 | 124 | 24 | 20 |
| CREATE SUBSCRIPTION | HIGH | 4 | 100 | 162 | 0.5 | 138 | 17 | 8 |
| CREATE SUBSCRIPTION | HIGH | 4 | 120 | 173 | 0.5 | 143 | 15 | 15.33333333 |
| CREATE SUBSCRIPTION | HIGH | 4 | 140 | 189 | 0.5 | 176 | 11 | 26 |
| CREATE SUBSCRIPTION | HIGH | 5 | 160 | 283 | 0.5 | 194 | 7 | 88.66666667 |
| CREATE SUBSCRIPTION | HIGH | 5 | 180 | 583 | 0.5 | 232 | 2 | 288.6666667 |
| CREATE SUBSCRIPTION | HIGH | 5 | 180 | 293 | 0.5 | 246 | 12 | 95.33333333 |
| CREATE SUBSCRIPTION | HIGH | 5 | 180 | 279 | 0.5 | 267 | 15 | 86 |

410

REDUCE EXPORT ORDER POD TO 1 → (row 9)
REDUCE BROWSE SUBSCRIPTION POD TO 1 → (row 10)

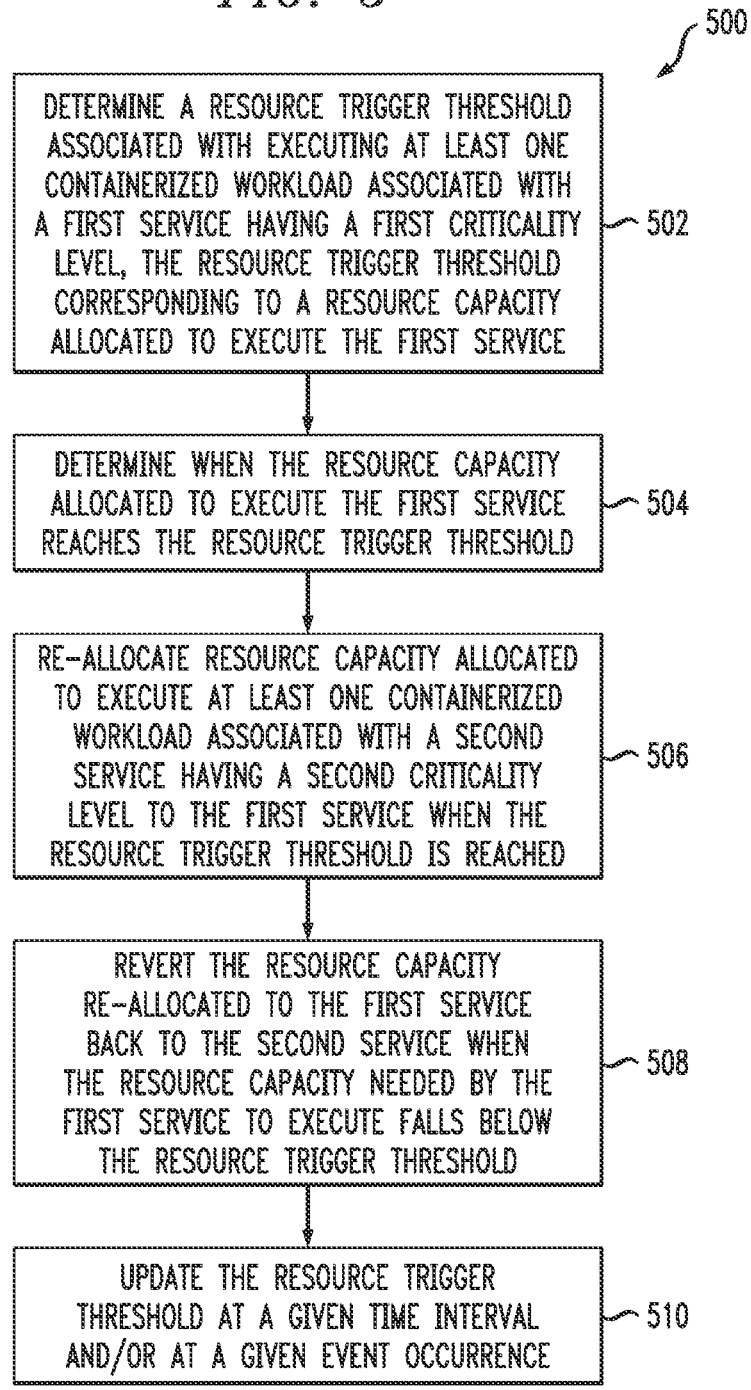

CRITICAL WORKLOAD MANAGEMENT IN CONTAINER-BASED COMPUTING ENVIRONMENT

FIELD

The field relates generally to information processing systems, and more particularly to container-based microservice management in such information processing systems.

BACKGROUND

Information processing systems increasingly utilize reconfigurable virtual resources to meet changing user needs in an efficient, flexible and cost-effective manner. For example, cloud-based computing and storage systems implemented using virtual resources in the form of containers have been widely adopted. Such containers may be used to provide at least a portion of the virtualization infrastructure of a given information processing system. However, significant challenges arise in efficiently managing container environments.

SUMMARY

Illustrative embodiments provide techniques for managing critical workloads in container-based computing environments.

For example, in an illustrative embodiment, a method comprises the following steps. The method determines a resource trigger threshold associated with executing at least one containerized workload associated with a first service having a first criticality level, the resource trigger threshold corresponding to a resource capacity allocated to execute the first service. The method determines when the resource capacity allocated to execute the first service reaches the resource trigger threshold, and then re-allocates resource capacity allocated to execute at least one containerized workload associated with a second service having a second criticality level to the first service when the resource trigger threshold is reached. For example, the first criticality level may be higher than the second criticality level.

In an additional illustrative embodiment, the method may revert the resource capacity re-allocated to the first service back to the second service when the resource capacity needed by the first service to execute falls below the resource trigger threshold. Further, the method may update the resource trigger threshold at a given time interval and/or at a given event occurrence.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments enable segregation of criticality of service workloads in a container-based computing environment. Further, illustrative embodiments enable calibrating and re-calibrating critical services to find the probable tripping resource state (i.e., resource trigger threshold). Still further, illustrative embodiments enable a microservice environment wherein a critical service manager module receives telemetry from a critical service and manages resource re-allocation from less critical and/or non-critical services. While such container management techniques are particularly effective in pod-based container environments, it is to be appreciated that the techniques can be implemented in other container-based computing environments.

These and other illustrative embodiments include, without limitation, apparatus, systems, methods and computer program products comprising processor-readable storage media.

BRIEF DESCRIPTION OF THE DRAWINGS

FIGS. 4A and 4B illustrate an example of critical service management for a pod-based container environment according to an illustrative embodiment.

FIG. 5 illustrates a critical service management methodology for a pod-based container environment according to an illustrative embodiment.

DETAILED DESCRIPTION

Figure 1:
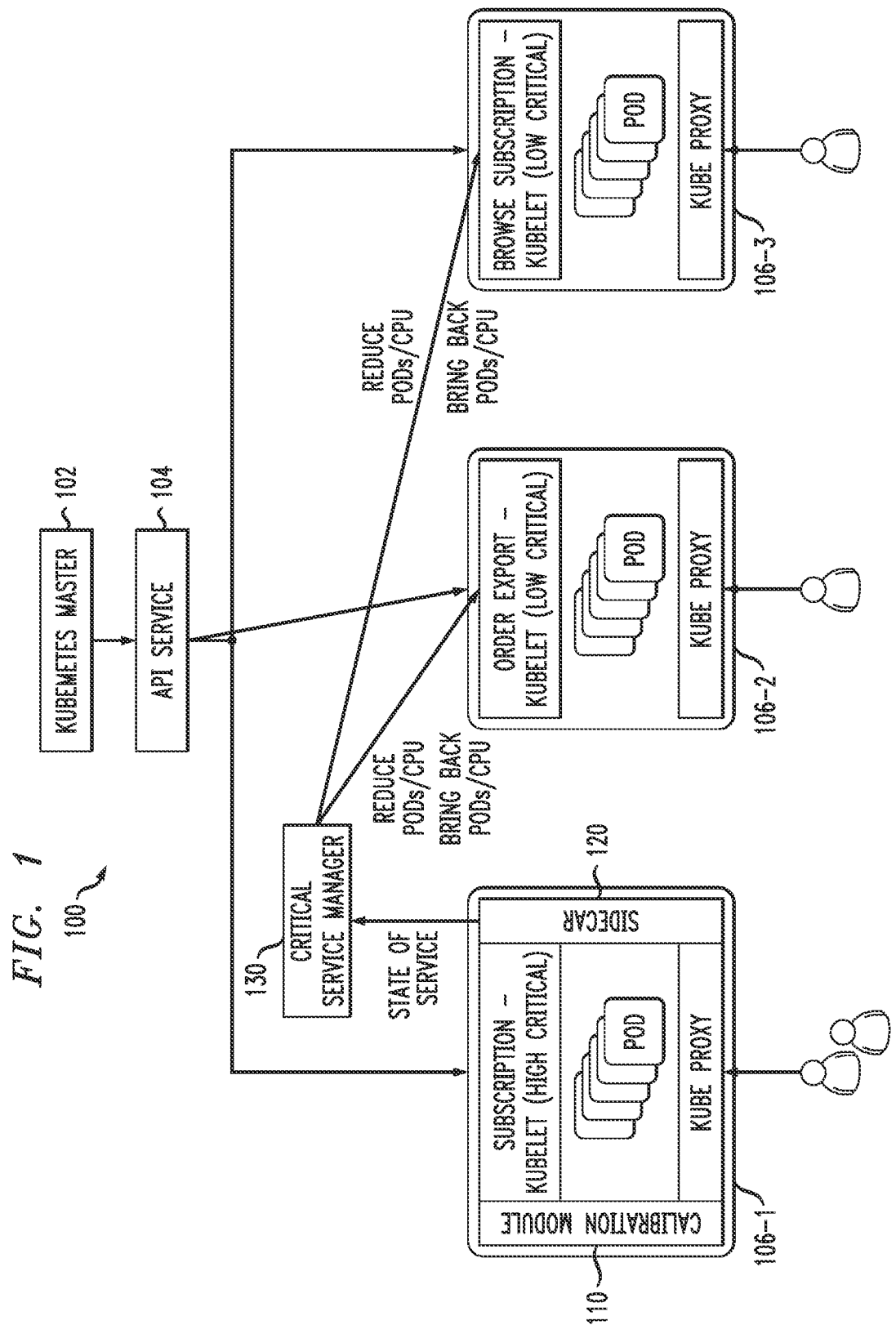
FIG. 1 illustrates a pod-based container environment with critical service management functionality according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing platforms comprising cloud and/or non-cloud computing and storage systems, as well as other types of processing systems comprising various combinations of physical and/or virtual processing resources. An information processing system may therefore comprise, by way of example only, at least one data center or other type of cloud-based system that includes one or more clouds hosting tenants that access cloud resources.

As the term is illustratively used herein, a container may be considered lightweight, stand-alone, executable software code that includes elements needed to run the software code. The container structure has many advantages including, but not limited to, isolating the software code from its surroundings, and helping reduce conflicts between different tenants or users running different software code on the same underlying infrastructure. The term "user" herein is intended to be broadly construed so as to encompass numerous arrangements of human, hardware, software or firmware entities, as well as combinations of such entities.

In illustrative embodiments, containers may be implemented using a Kubernetes container orchestration system. Kubernetes is an open-source system for automating application deployment, scaling, and management within a container-based environment comprised of components referred to as pods, nodes and clusters, as will be further explained below. Types of containers that may be implemented or otherwise adapted within the Kubernetes system include, but are not limited to, Docker containers or other types of Linux containers (LXCs) or Windows containers. Kubernetes has become the prevalent container orchestration system for managing containerized workloads. It is rapidly being adopted by many enterprise-based information technology (IT) organizations to deploy its application programs (application). By way of example only, such applications may include both newly architected stateless or inherently redundant scale-out applications, as well as existing stateful applications. Non-limiting examples of stateful applications may include legacy databases such as Oracle, MySQL, and PostgreSQL, as well as other stateful applications that are not inherently redundant. While the Kubernetes container orchestration system is used to illustrate various embodiments, it is to be understood that alternative container orchestration systems can be utilized.

Some terminology associated with the Kubernetes container orchestration system will now be explained. In general, for a Kubernetes environment, one or more containers are part of a pod. Thus, the environment may be referred to, more generally, as a pod-based system, a pod-based container system, a pod-based container orchestration system, a pod-based container management system, or the like. As mentioned above, the containers can be any type of container, e.g., Docker container, etc. Furthermore, a pod is typically considered the smallest execution unit in the Kubernetes container orchestration environment. A pod encapsulates one or more containers. One or more pods are executed on a worker node. Multiple worker nodes form a cluster. A Kubernetes cluster is managed by a master node. By way of example, pods represent the respective processes running on a cluster. A pod may be configured as a single process wherein one or more containers execute one or more functions that operate together to implement a service. Pods may each have a unique Internet Protocol (IP) address enabling pods to communicate with one another, and for other system components to communicate with each pod. Further, pods may each have persistent storage volumes associated therewith. Configuration information (configuration objects) indicating how a container executes can be specified for each pod.

Container-based microservice architectures have profoundly changed the way development and operations teams test and deploy modern software. Containers help companies modernize by making it easier to scale and deploy applications. By way of example, Kubernetes helps developers and microservice operations teams because it manages the container orchestration well. However, Kubernetes is more than a container orchestrator, as it can be considered an operating system for cloud-native applications in the sense that it is the platform that applications run on, (e.g., just as desktop applications run on MacOS, Windows, or Linux).

Furthermore, Kubernetes aims to reduce the burden of orchestrating underlying compute, network, and storage infrastructure, and enable application operators and developers to focus entirely on container-centric workflows for self-service operation. More particularly, Kubernetes allows developers to build customized workflows and higher-level automation to deploy and manage applications composed of multiple containers.

One of the main features of Kubernetes in the networking side is pod creation. As explained above, pods are the smallest deployable units of computing that can be created and managed in Kubernetes. A pod can be as small as a single service with a single container or may be large with a plurality of containers. Users can define how many pods need to run for a service using a replica set. When the container loads, the defined number of pods will be loaded for that service. More pods means more resource allocation. One can define how much memory and central processing unit (CPU) the container can use for a service and in turn the pods. For example, if a maximum memory resource consumption occurs, then the service will throw an out-of-memory exception.

In a Kubernetes-based microservices platform, services are load balanced among pods. It is realized herein that, currently, if some less (or non) critical services are running with a considerable amount of resource utilization, and at the same time a critical service request came in, there is a possibility that critical service pods will not have enough resources to execute and will eventually cause an out-of-memory exception and halt the operation. Moreover, when less critical services are consuming a finite set of resources (e.g., processing capacity, memory capacity, etc.), critical service response time may violate a service level agreement (SLA).

Illustrative embodiments address the above and other challenges in container-based microservice platforms such as, but not limited to, a Kubernetes platform. For example, illustrative embodiments define a criticality for each specific microservice such that critical service pods (e.g., most or highly critical service pods in a defined criticality scale) are given resource priority over pods executing services of lower criticality. In one or more illustrative embodiments, low priority service pods are instructed to free-up resources if needed for critical service pods based on machine learning (e.g., behavior of critical microservice) and calibration/recalibration of resources required for that service in production is performed. A microservice architecture arranges an application as a collection of loosely-coupled services. However, as illustratively used herein, a microservice is one example of a service.

By way of example only, illustrative embodiments may define applications for different types of services based on criticality as follows:
  (i) Low criticality (e.g., Excel Export from a report. This service is ok to fail, client can retry after some time);
  (ii) Medium criticality (e.g., Viewing Subscription Summary. There will be some impact, if this service is down. If the customer later retries, and can view the subscription summary, the customer should be fine); and
  (iii) High criticality (e.g., Operation with SLA-defined response time. We cannot allow this to fail. If failed, there will be significant impact to the customer. Another example may be a subscription placement microservice which needs to be prioritized, for example, to maintain customer satisfaction).

The scale or level of criticality above (low, medium, and high) is intended as an example embodiment. Other criticality scales/levels, e.g., numeric or otherwise, can be implemented in alternative embodiments.

In an application, all of these services (and internally pods) will be up and running and will be used. Assume the following scenario:
  (i) Some users are exporting Excel spreadsheets (low critical) and consuming a significant amount of resources (e.g., CPU and memory).
  (ii) At the same time, assume some users are trying to place subscriptions (highly critical/high criticality service). Since low priority pods consume significant resources, there is a high probability that the highly critical services may fail by giving an out of memory exception unless the underlying virtual processing entity has that much CPU and memory to allocate to all services.

Illustrative embodiments provide that in order to achieve smooth operation of critical pods in a resource-limited scenario, a critical service manager can communicate with low criticality pods to have the low criticality service reduce their resource consumption or terminate such that the resources can be re-allocated to highly critical pods. Advantageously, if the low criticality service can reduce its resource consumption, a high criticality service will acquire those resources and can then successfully complete the task.

FIG. 1 illustrates a pod-based container environment 100 with critical service management functionality according to an illustrative embodiment. As shown, pod-based container environment 100 is based on a Kubernetes microservice architecture. As such, pod-based container environment 100 comprises master node 102, an application programming interface (API) service 104, and worker nodes 106-1, 106-2 and 106-3 (collectively referred to herein as worker nodes 106 and individually as worker node 106). While three worker nodes 106 are shown, it is to be understood that this is for illustration purposes only and more or less worker nodes can be part of a cluster managed by master node 102. Similarly, illustrative embodiments provide for critical services across more than one cluster and master node. In general, API service 104 exposes a Kubernetes API, which is the front end of the Kubernetes container orchestration system.

As illustrated, each worker node 106 corresponds to a service, e.g., worker node 106-1 corresponds to a subscription service that is implemented by software code executed as one or more workloads (containers) of one or more pods associated with worker node 106-1; worker node 106-2 corresponds to an order export service that is implemented by software code executed as one or more workloads (containers) of one or more pods associated with worker node 106-2; and worker node 106-3 corresponds to a browse subscription service that is implemented by software code executed as one or more workloads (containers) of one or more pods associated with worker node 106-3. As illustratively used herein, a pod may be considered an example of a containerized workload. A criticality level is defined for these services wherein the subscription service implemented on worker node 106-1 is considered high critical, while the order export service implemented on worker node 160-2 and the browse subscription service implemented on worker node 106-3 are considered low critical (i.e., less critical then a high critical service). Each worker node 106 has a kubelet and kube proxy. A kubelet is the primary node agent that runs on each node and registers the node with API service 104. A kube proxy is a network proxy that runs on each node in a cluster and maintains network rules on nodes which allow network communication to pods from network sessions inside or outside of the cluster.

As further shown, pod-based container environment 100 comprises three modules that enable critical service management functionality: calibration module 110, sidecar module 120, and critical service manager module 130. As will be explained in further detail below, calibration module 110 calibrates/re-calibrates the critical service, i.e., subscription service implemented by worker node 160-1, to determine the tripping resource state (i.e., resource trigger threshold) for the service in that environment. Sidecar module 120, also implemented in the worker node executing the critical service (i.e., 106-1) collects the current resource consumption data (status information or state of critical service) and sends this data to critical service manager module 130 at the time of a tripping resource state. Critical service manager module 130: (a) allows an administrator (user) to classify services as high critical and low critical (or based on whatever criticality scale is used); (b) receives the status information from the high critical service (i.e., 106-1) at the tripping resource state and re-allocates resources from one or more low critical services (i.e., 106-2 and 106-3) to the high critical service; and (c) reverts the re-allocated resources back to normal when the critical service recovers from the need for the additional resources. Critical service manager module 130 may be implemented on a worker node 106, master node 102, and/or some other computing node of pod-based container environment 100.

It is assumed that each critical service (i.e., 106-1) knows what resources it needs for smooth execution (e.g., expected performance, SLA-compliance, etc.) for anticipated parallel requests in real-time (online) conditions. Accordingly, illustrative embodiments provide for calibration of the services in a production environment via calibration module 110. It is further realized that, in each environment, resource availability will be different. Thus, initially, a calibration service is run in production for a predefined time (e.g., one month or for a number of breakeven points) along with all other services.

As the platform increases the number of pods, more requests can be served. However, more pods mean more resource consumption requested of the resource provider. Since resources cannot be extended after a point of time (e.g., a finite set of resources), it is important to evaluate resource scenarios with all other services running in the system. Thus, in illustrative embodiments, calibration module 110 ramps up requests to determine the tripping point where response time starts deteriorating for the critical service. This is called the resource tripping state or resource trigger threshold. Once the critical service reaches the calibrated triggering point, the critical service sends its status information to critical service manager module 130 via sidecar module 120. Critical service manager module 130 reacts, for example, by reducing the pods running one or more less critical and/or non-critical services.

Figure 2:
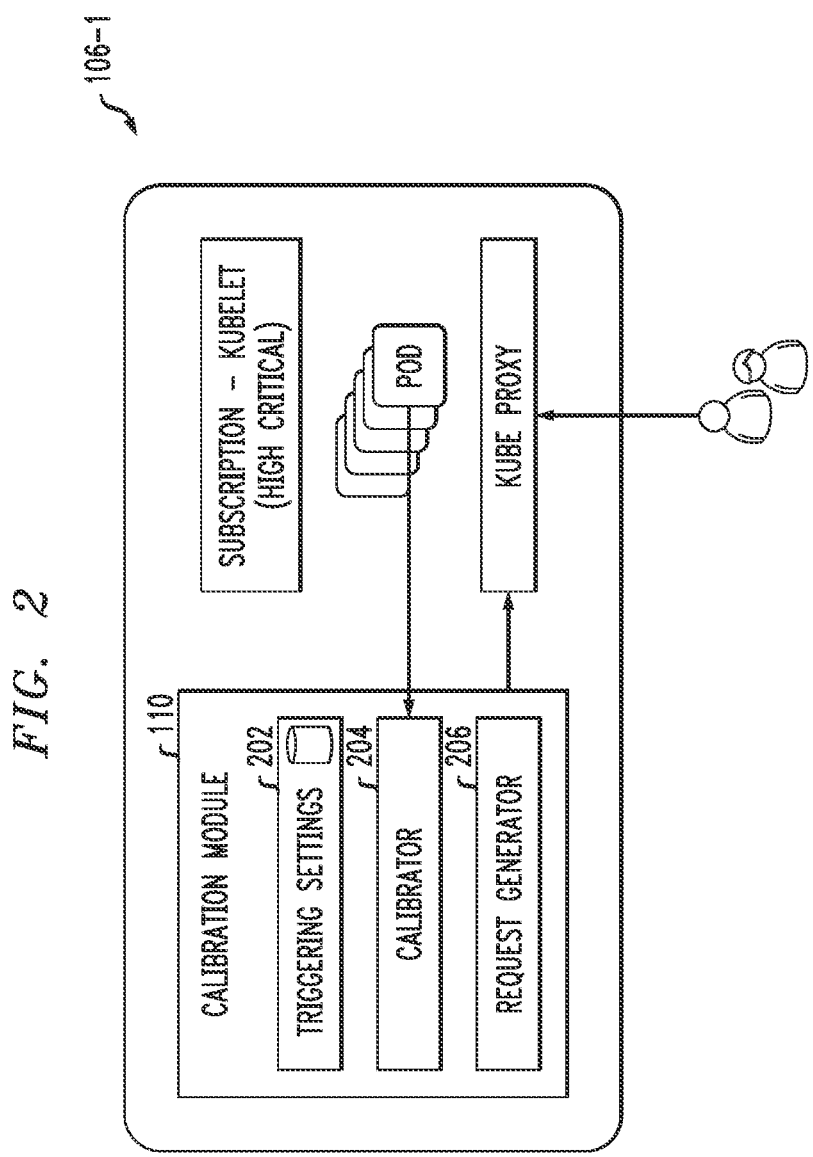
FIG. 2 illustrates details of a calibration module in a pod-based container environment with critical service management functionality according to an illustrative embodiment.

FIG. 2 illustrates details of calibration module 110 of worker node 106-1 according to an illustrative embodiment. Calibration module 110, as shown, comprises a triggering settings storage 202, a calibrator 204 and a request generator 206. Thus, calibration module 110 uses calibrator 204 and request generator 206 in a feedback manner to determine the resource point at which the critical service deteriorates (trips or triggers) to an unacceptable (or SLA violative) threshold. This tripping or triggering resource point is stored in triggering settings storage 202.

Figure 3:
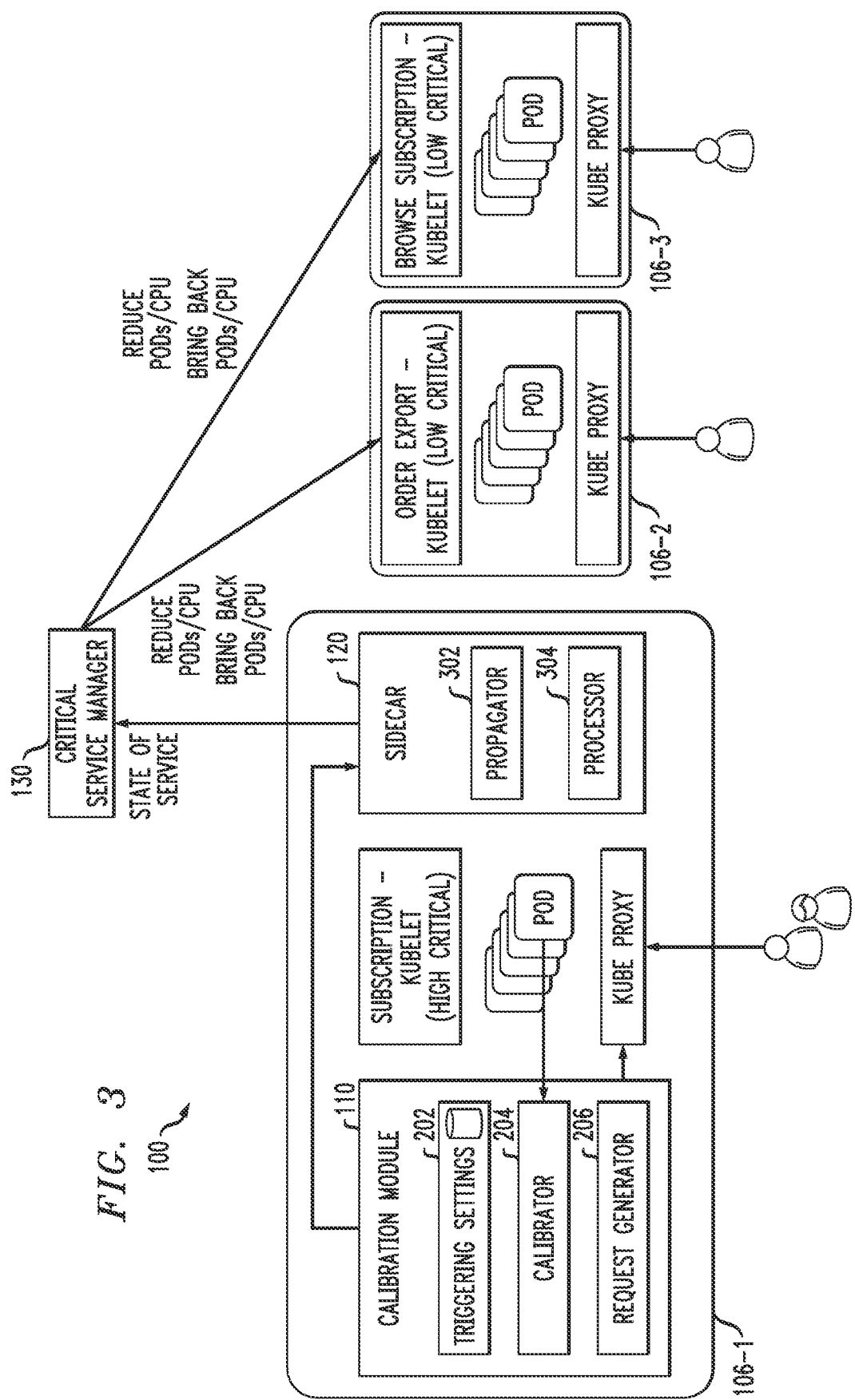
FIG. 3 illustrates details of a sidecar module in a pod-based container environment with critical service management functionality according to an illustrative embodiment.

FIG. 3 illustrates details of a sidecar module 120 of worker node 106-1 according to an illustrative embodiment. Sidecar module 120, as shown, comprises a propagator 302 and a processor 304. In one illustrative embodiment, processor 304 reads the data in triggering settings storage 202 of calibration module 110. In an alternative illustrative embodiment, calibration module 110 reports all or parts of the data stored in triggering settings storage 202 to processor 304. As described above, once the critical service reaches the calibrated triggering point (resource trigger threshold) and processor 304 becomes aware of this condition, propagator 302 of sidecar module 120 sends status information. Note that status information (state of service) may, for example, include raw and/or processed status data from calibration module 110 and/or a message generated by processor 304 indicating that the critical service executed by worker node 106-1 needs additional resources. Critical service manager module 130 reacts, for example, by reducing the pods running one or more less critical and/or non-critical services, e.g., diverting CPU and/or memory resources from services run by pods of worker node 106-2 and/or worker node 106-3 to the critical service run by pods of worker node 106-1. This may involve temporarily suspending or terminating pods running on worker nodes 106-2 and/or 106-3. When the resources needed by the critical service run by worker node 106-1 fall back below the trigger threshold (as reported by sidecar module 120 to critical service manager module 130), resources are re-allocated back to a state where the services of worker nodes 106-2 and/or 106-3 operate again as normal (i.e., prior to the re-allocation or some other resource capacity state).

FIGS. 4A and 4B illustrate an example via tables 400 and 410, respectively, of critical service management for a pod-based container environment according to an illustrative embodiment. Assume that three services with defined criticality are running in a Kubernetes cluster of worker nodes (e.g., 106-1, 106-2 and 106-3 described above): (i) Subscription Creation (High Critical); (ii) Export Order (Low Critical); and (iii) Search/Browse Subscription (Low Critical).

In table 400, it can be seen that 5 pods with 160 requests/minute and a response time variation from an initial response (150 milliseconds) goes to 89% (more than 50%). It is also evident that CPU usage is well under 500 Milli Core. Then, for the next set of requests (180 request/minute) the response time variation shoots up to 288+% and available free memory is only 7 Megabytes. Thus, the next surge will result in an out of memory exception for the critical service. Thus, the critical service management system will determine the point where there is >80% variation in response time and <10 MB memory space. This is accomplished by calibration module 110, as explained above. Now the service is calibrated for optimal service as: 160 Request/Min, 0.5 CPU, 4 PODs, <8 MB Free Memory. This will be the triggering point for communicating to other services to free up memory (or required CPU).

Once the critical service reaches the calibrated triggering point, it starts telemetry to the critical service manager module 130 using the above-described sidecar implementation. Critical service manager module 130 is aware of all low critical services, and reduces pods running by terminating or suspending pods one by one using the following command: kubectl delete pod←-all|pod name>.

As shown in table 410, critical service manager module 130 can also set the pod limit to 1, until the critical service is stable and back to normal. When the request/minute becomes normal and the number of pods in the critical service and free memory is back to normal, critical service manager module 130 resets the low critical service pod settings.

FIG. 5 illustrates a critical service management methodology 500 for a pod-based container environment according to an illustrative embodiment. It is to be understood that, in illustrative embodiments, methodology 500 is performed by pod-based container environment 100 of FIG. 1.

As shown, step 502 determines a resource trigger threshold associated with executing at least one containerized workload associated with a first service having a first criticality level, the resource trigger threshold corresponding to a resource capacity allocated to execute the first service. Step 504 determines when the resource capacity allocated to execute the first service reaches the resource trigger threshold. Step 506 re-allocates resource capacity allocated to execute at least one containerized workload associated with a second service having a second criticality level to the first service when the resource trigger threshold is reached. Resource re-allocation from the second service may, for example, include terminating one or more pods while leaving one or more other pods executing, reducing CPU capacity (consumption) to a minimum, and/or raising the exception to a user (e.g., notify that a critical service is executing and thus to expect delays in other services). Step 508 reverts the resource capacity re-allocated to the first service back to the second service when the resource capacity needed by the first service to execute falls below the resource trigger threshold. Step 510 updates the resource trigger threshold at a given time interval and/or at a given event occurrence.

The particular processing operations and other system functionality described in conjunction with the diagrams described herein are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

Advantageously, as explained herein, illustrative embodiments provide many advantages, for example: (i) segregation of criticality of service pods in a Kubernetes-based microservice environment; (ii) calibration and re-calibration of critical services to find the probable tripping resource state; and (iii) critical service manager in a Kubernetes microservice node to receive status information from a critical service and manages the resource re-allocation from the low critical services.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for managing critical service workloads in container environments will now be described in greater detail with reference to FIGS. 6 and 7. Although described in the context of systems/module/processes of FIGS. 1-5, these platforms may also be used to implement at least portions of other information processing systems in other embodiments.

Figure 6:
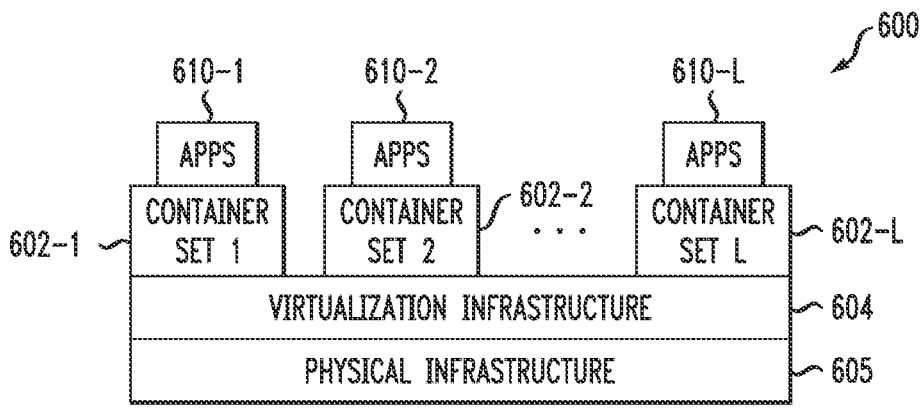
FIGS. 6 and 7 show examples of processing platforms that may be utilized to implement at least a portion of an information processing system with a pod-based container environment with critical service management functionality according to one or more illustrative embodiments.
Figure 7:
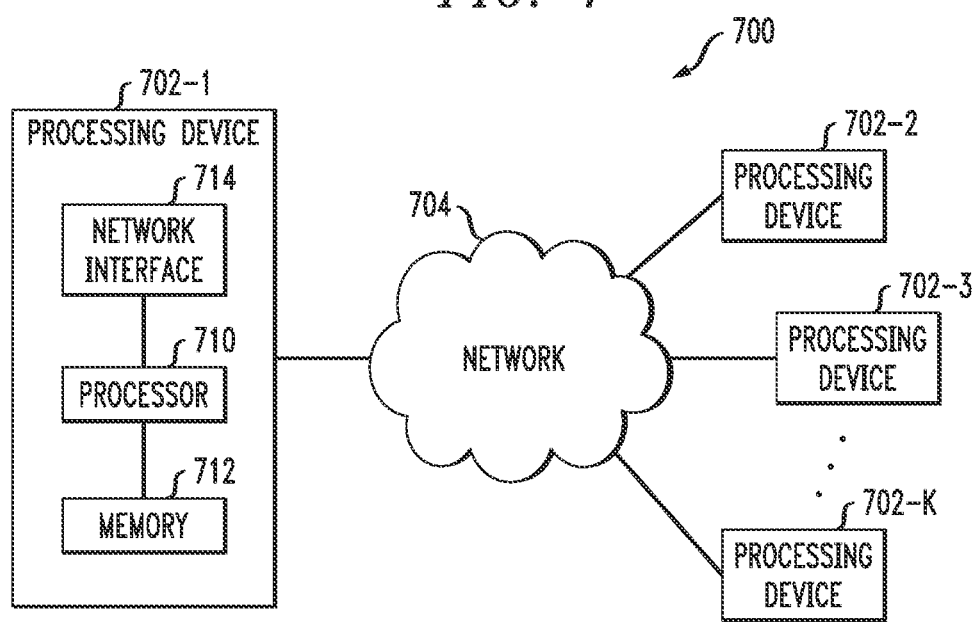

FIG. 6 shows an example processing platform comprising cloud infrastructure 600. The cloud infrastructure 600 comprises a combination of physical and virtual processing resources that may be utilized to implement at least a portion of the pod-based container environment 100. The cloud infrastructure 600 comprises multiple container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure.

The cloud infrastructure 600 further comprises sets of applications 610-1, 610-2, . . . 610-L running on respective ones of the container sets 602-1, 602-2, . . . 602-L under the control of the virtualization infrastructure 604. The container sets 602 may comprise respective sets of one or more containers.

In some implementations of the FIG. 6 embodiment, the container sets 602 comprise respective containers implemented using virtualization infrastructure 604 that provides operating system level virtualization functionality, such as support for Kubernetes-managed containers.

As is apparent from the above, one or more of the processing modules or other components of pod-based container environment 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of pod-based container environment 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and systems/modules/processes of FIGS. 1-5 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality as disclosed herein are illustratively implemented in the form of software running on one or more processing devices.

In some embodiments, storage systems may comprise at least one storage array implemented as a Unity™, PowerMax™, PowerFlex™ (previously ScaleIO™) or PowerStore™ storage array, commercially available from Dell Technologies. As another example, storage arrays may comprise respective clustered storage systems, each including a plurality of storage nodes interconnected by one or more networks. An example of a clustered storage system of this type is an XtremIO™ storage array from Dell Technologies, illustratively implemented in the form of a scale-out all-flash content addressable storage array.

It should again be emphasized that the above-described embodiments are presented for purposes of illustration only. Many variations and other alternative embodiments may be used. For example, the disclosed techniques are applicable to a wide variety of other types of information processing systems, host devices, storage systems, container monitoring tools, container management or orchestration systems, container metrics, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising at least one processor coupled to at least one memory, the at least one processing platform, when executing program code, is configured to:
calibrate a resource trigger threshold for at least a first service of one or more services by increasing requests for the one or more services in order to determine the resource trigger threshold associated with executing at least one containerized workload associated with the first service having a first criticality level, the resource trigger threshold corresponding to a resource capacity allocated to execute the first service wherein a response time for the first service begins deteriorating past the resource trigger threshold;
determine when the resource capacity allocated to execute the first service reaches the resource trigger threshold; and
re-allocate resource capacity allocated to execute at least one containerized workload associated with a second service having a second criticality level to the first service when the resource trigger threshold is reached.

2. The apparatus of claim 1, wherein the first criticality level is higher than the second criticality level.

3. The apparatus of claim 1, wherein the processing platform, when executing program code, is further configured to revert the resource capacity re-allocated to the first service back to the second service when the resource capacity needed by the first service to execute falls below the resource trigger threshold.

4. The apparatus of claim 1, wherein the processing platform, when executing program code, is further configured to update the resource trigger threshold at a given time interval and/or at a given event occurrence.

5. The apparatus of claim 1, wherein the resource capacity corresponding to the resource trigger threshold is the resource capacity above which the first service is at risk of not executing as anticipated.

6. The apparatus of claim 1, wherein the containerized workload of the first service is executable as one or more pods on a first worker node, while the containerized workload of the second service is executable as one or more pods on a second worker node.

7. The apparatus of claim 6, wherein re-allocating resource capacity allocated to execute the containerized workload associated with the second service to the first service when the resource trigger threshold is reached further comprises re-allocating at least one of processing capacity and memory capacity associated with the one or more pods of the second worker node to the one or more pods of the first worker node.

8. The apparatus of claim 6, wherein re-allocating resource capacity allocated to execute the containerized workload associated with the second service to the first service when the resource trigger threshold is reached is performed by a service manager module.

9. The apparatus of claim 8, wherein the determining the resource trigger threshold associated with executing the containerized workload associated with the first service, and determining when the resource capacity allocated to execute the first service reaches the resource trigger threshold are performed by the first worker node.

10. The apparatus of claim 9, wherein the first worker node comprises a calibration module for performing the calibration, determination and re-allocation, and a sidecar module for notifying the service manager module that the resource trigger threshold has been reached.

11. A method comprising:
calibrating a resource trigger threshold for at least a first service of one or more services by increasing requests for the one or more services in order to determine the resource trigger threshold associated with executing at least one containerized workload associated with the first service having a first criticality level, the resource trigger threshold corresponding to a resource capacity allocated to execute the first service wherein a response time for the first service begins deteriorating past the resource trigger threshold;
determining when the resource capacity allocated to execute the first service reaches the resource trigger threshold; and
re-allocating resource capacity allocated to execute at least one containerized workload associated with a second service having a second criticality level to the first service when the resource trigger threshold is reached.

12. The method of claim 11, wherein the first criticality level is higher than the second criticality level.

13. The method of claim 11, further comprising reverting the resource capacity re-allocated to the first service back to the second service when the resource capacity needed by the first service to execute falls below the resource trigger threshold.

14. The method of claim 11, further comprising updating the resource trigger threshold at a given time interval and/or at a given event occurrence.

15. The method of claim 11, wherein the resource capacity corresponding to the resource trigger threshold is the resource capacity above which the first service is at risk of not executing as anticipated.

16. The method of claim 11, wherein the containerized workload of the first service is executable as one or more pods on a first worker node, while the containerized workload of the second service is executable as one or more pods on a second worker node.

17. The method of claim 16, wherein re-allocating resource capacity allocated to execute the containerized workload associated with the second service to the first service when the resource trigger threshold is reached further comprises re-allocating at least one of processing capacity and memory capacity associated with the one or more pods of the second worker node to the one or more pods of the first worker node.

18. The method of claim 16, wherein re-allocating resource capacity allocated to execute the containerized workload associated with the second service to the first service when the resource trigger threshold is reached is performed by a service manager module.

19. The method of claim 18, wherein the determining the resource trigger threshold associated with executing the containerized workload associated with the first service, and determining when the resource capacity allocated to execute the first service reaches the resource trigger threshold are performed by the first worker node.

20. A computer program product comprising a non-transitory processor-readable storage medium having stored therein program code of one or more software programs, wherein the program code when executed by at least one processing platform causes the at least one processing platform to:
calibrate a resource trigger threshold for at least a first service of one or more services by increasing requests for the one or more services in order to determine the resource trigger threshold associated with executing at least one containerized workload associated with the first service having a first criticality level, the resource trigger threshold corresponding to a resource capacity allocated to execute the first service wherein a response time for the first service begins deteriorating past the resource trigger threshold;
determine when the resource capacity allocated to execute the first service reaches the resource trigger threshold; and
re-allocate resource capacity allocated to execute at least one containerized workload associated with a second service having a second criticality level to the first service when the resource trigger threshold is reached.

\* \* \* \* \*